G. M. HUSTON.
Egg-Carriers.
No. 140,580.
Patented July 8, 1873.
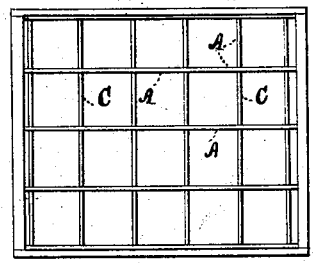
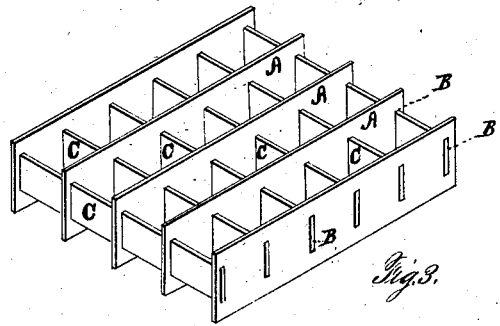
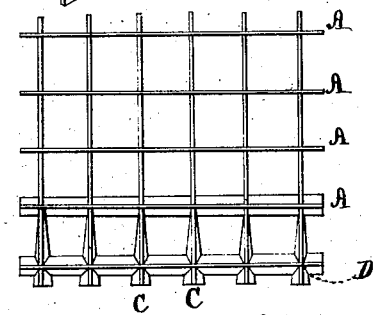
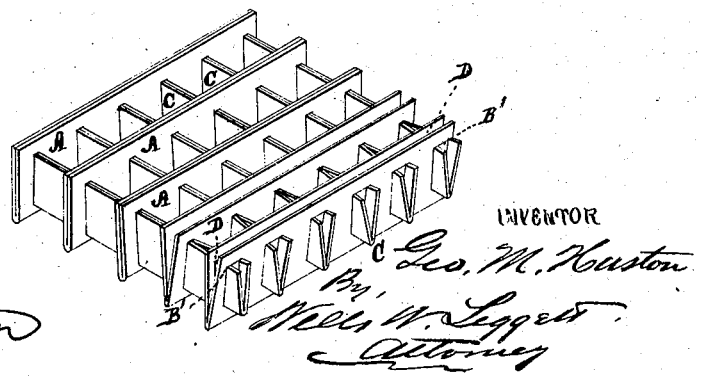
WITNESSES
INVENTOR

UNITED STATES PATENT OFFICE.

GEORGE M. HUSTON, OF ZANESVILLE, OHIO.

IMPROVEMENT IN EGG-CARRIERS.

Specification forming part of Letters Patent No. 140,580, dated July 8, 1873; application filed October 17, 1872.

CASE C.

*To all whom it may concern:*

Be it known that I, GEORGE M. HUSTON, of Zanesville, in the county of Muskingum and State of Ohio, have invented certain new and useful Improvements in Egg-Carriers; and I do hereby declare that the following is a full, clear, and exact description thereof that will enable others skilled in the art to which it appertains to make and use the same, reference being had to the accompanying drawings and to the letters of reference marked thereon which form a part of this specification.

In the drawings, Figure 1 is plan view of carrier made of single strips or strands. Fig. 2 perspective view of same. Fig. 3 is plan view of same made with double thicknesses, showing also how, with triangular holes, the material may be spread. Fig. 4 perspective view of Fig. 3.

My invention consists as follows: I take a suitable number of strips, A, of straw-board, or any other suitable material, and pierce them with openings B B, through which the pieces C, made narrower than A, are slipped, each piece or strip C passing through the corresponding openings B in all of the pieces A, thus binding them all firmly together and forming a stiff and strong frame-work. The openings B B are made close enough to bind upon the narrow strips C, and thus to hold the whole structure rigid.

Instead of the openings B being made straight and narrow they may be made triangular in shape, as shown at B′, and the strips may be made double so that, if desired, wedges D D can be driven between their edges and give the cells a shape like the frustum of a pyramid.

It will be seen that in both cases I dispense entirely with cutting half of the pieces while the other half are only pierced with openings B B′, none of the openings being extended through to the edges; I, therefore, avoid all feathered ends or edges, which are necessarily weak, and are rendered by a little use entirely worthless.

Instead of making the strips of stiff material I propose sometimes to use a border frame of wood, pierced with holes B, through which the partitions are formed by drawing through a piece of broad tape or other suitable material. Then, in order to form the partitions at right angles, I thread the material into a sacking-needle and force it through the other strands; or holes may be cut in one set of partition-strands and the other set pass through these holes, as shown in Fig. 1.

These carriers all present solid edges and ends, and are, therefore, very durable, and they may be incased in a frame of wood, or pasteboard, straw-board, &c.

Having thus described my invention, what I claim as new, and desire to secure by Letters Patent, is—

The egg-carrier herein described, composed of continuous partition-pieces A and C, when constructed and united in the manner substantially as set forth and shown.

In testimony that I claim the foregoing I have hereunto set my hand this 15th day of October, 1872.

G. M. HUSTON.

Witnesses:
WELLS W. LEGGETT,
WM. G. HENDERSON.